W. O. GROVER.
Bird-Cages.
No. 146,249.
Patented Jan. 6, 1874.
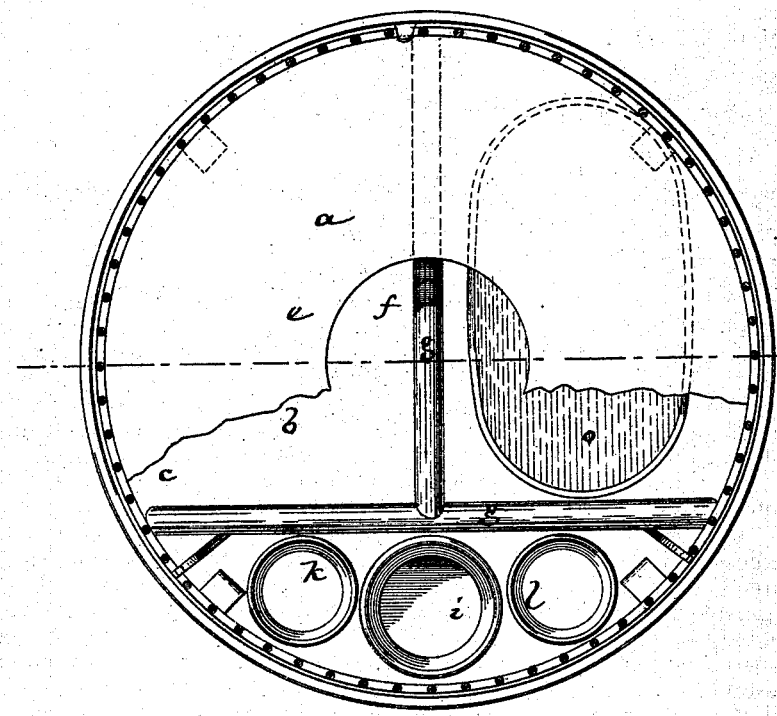
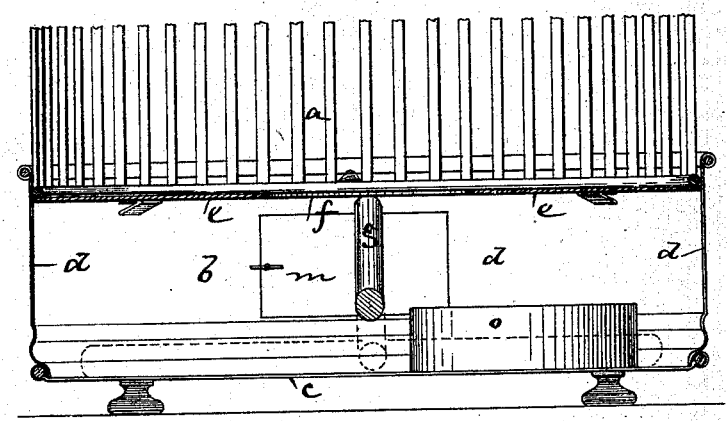
Witnesses.
M. W. Frothingham.
L. H. Latimer.
Inventor.
William O. Grover
By his Attys.
Crosby & Gould.

UNITED STATES PATENT OFFICE.

WILLIAM O. GROVER, OF BOSTON, MASSACHUSETTS.

IMPROVEMENT IN BIRD-CAGES.

Specification forming part of Letters Patent No. 146,249, dated January 6, 1874; application filed September 25, 1873.

*To all whom it may concern:*

Be it known that I, WILLIAM O. GROVER, of Boston, in the county of Suffolk and State of Massachusetts, have invented an Improvement in Bird-Cages; and I do hereby declare that the following, taken in connection with the drawings which accompany and form part of this specification, is a description of my invention sufficient to enable those skilled in the art to practice it.

In the common construction of bird-cages, the wire or open work extends nearly, or quite, to the bottom of the cage, and the seed and water cups, and often a bathing-dish, either stand upon the cage-bottom or against the open-work sides. The result of such construction and arrangement is, that the seeds and water are strewed from the cage, injuring carpets, splashing windows, and accumulating dust and dirt.

My invention is made for the remedy of such results, or to obviate them, and for this purpose I form the bottom part of the cage with an auxiliary or sub chamber, inclosed at bottom, at the sides, and at the top with a sufficiently large hole in the top plate to admit free entrance and egress of the bird. The wire-work extends to this top plate, and beneath the plate may be placed a landing-perch, while upon the bottom plate stand the seed and water cups, and also the bathing-dish, a suitable door opening into one side of the chamber to receive such cups and dish.

My invention consists in a cage having such a bottom chamber for feeding, &c.

The drawing shows a cage embodying the invention, only the lower part of the cage being shown.

Figure 1 represents a cross-section of the cage above the sub-chamber. Fig. 2 represents the parts in sectional elevation.

$a$ denotes the body or main chamber of the cage, and $b$ denotes the sub-chamber. The latter chamber is formed with a bottom plate, $c$, from which extends a rim, $d$, and upon the upper part of this rim rests the top plate $e$, in which plate is the central hole or passage $f$, that forms communication between the two chambers. The height of the sub-chamber is such as to permit free movements of a bird, and the passage of the bird from chamber to chamber may be facilitated by the perch $g$. On the floor $c$ stand the seed and water cups $i\ k\ l$, which may be readily removed and put in place through a door, $m$. The bathing-dish $o$ is also shown as standing on the floor. The chamber $b$ is preferably connected to the main body by suitable hooks or catches, that permit it to be readily removed for cleaning, &c., the top plate being made removable from the rim $d$. The rim $d$ may have windows or openings, but generally the light through the passage $f$ is sufficient.

I claim—

A bird-cage having the sub-chamber $b$, covered by the impervious top plate $e$, in which is formed the passage $f$.

W. O. GROVER.

Witnesses:
FRANCIS GOULD,
M. W. FROTHINGHAM.